(12) United States Patent
Junger

(10) Patent No.: US 8,136,554 B2
(45) Date of Patent: Mar. 20, 2012

(54) MOLDED PLASTIC PIPE

(75) Inventor: Dieter Junger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 187 days.

(21) Appl. No.: 12/528,607

(22) PCT Filed: Jan. 25, 2008

(86) PCT No.: PCT/EP2008/050853
§ 371 (c)(1),
(2), (4) Date: Aug. 25, 2009

(87) PCT Pub. No.: WO2008/107222
PCT Pub. Date: Sep. 12, 2008

(65) Prior Publication Data
US 2010/0326555 A1 Dec. 30, 2010

(30) Foreign Application Priority Data
Mar. 7, 2007 (DE) .................. 10 2007 011 041

(51) Int. Cl.
*F15D 1/04* (2006.01)
(52) U.S. Cl. .......... 138/39; 138/177; 138/178; 138/137; 138/140; 138/109
(58) Field of Classification Search .................. 138/137, 138/140, 141, 39, 44; 428/36.4, 35.9, 177, 428/178, 109
See application file for complete search history.

(56) References Cited

U.S. PATENT DOCUMENTS

| 5,693,284 | A | | 12/1997 | Mukawa ........................ 264/513 |
| 5,699,835 | A | * | 12/1997 | Nakagawa et al. ........... 138/141 |
| 5,804,268 | A | | 9/1998 | Mukawa ...................... 428/36.4 |
| 5,937,909 | A | * | 8/1999 | Clauss et al. .................... 138/43 |
| 6,119,728 | A | * | 9/2000 | Seidel-Peschmann et al. . 138/26 |
| 2004/0100093 | A1 | | 5/2004 | Leigh-Monstevens |
| 2006/0054231 | A1 | * | 3/2006 | Wolfram et al. .............. 138/109 |
| 2006/0278292 | A1 | * | 12/2006 | Froitzheim et al. ........... 138/137 |
| 2011/0139288 | A1 | * | 6/2011 | Rushlander et al. .......... 138/137 |

FOREIGN PATENT DOCUMENTS

| DE | 4141393 A1 | 6/1993 |
| EP | 1790453 A1 | 5/2007 |
| GB | 2267678 A | 12/1993 |
| JP | 1156025 A | 6/1989 |

* cited by examiner

*Primary Examiner* — Patrick F Brinson
(74) *Attorney, Agent, or Firm* — Ronald E. Greigg

(57) ABSTRACT

The invention relates to a plastic molded pipe, in particular for fuel-conducting return lines in injection systems for internal combustion engines. The plastic molded pipe has an inner pipe and an outer encapsulation made of a plastic material with connectors for additional components of the fuel injection system. The inner pipe is embodied as a plastic inner pipe with at least one bend.

8 Claims, 3 Drawing Sheets

MOLDED PLASTIC PIPE

CROSS-REFERENCE TO RELATED APPLICATION

This application is based on PCT/EP2008/050853 filed 25 Jan. 2008.

BACKGROUND OF THE INVENTION

1. Field of the Invention

The invention relates to a plastic molded pipe, in particular for fuel-conducting return lines in injection systems for internal combustion engines.

2. Description of the Prior Art

In fuel injection systems, such as unit injection systems (UI) or high-pressure reservoir injection systems (common rails), along with a high-pressure pump, high-pressure reservoir body, such as unit fuel injectors, and the fuel injectors in the return region for the fuel, that is, on the low-pressure side of the injection system, plastic pipes are used. By way of these molded plastic pipes disposed in the low-pressure region of the fuel injection system the fuel, such as a diverted control quantity, that occurs upon actuation of the fuel injectors is returned to the tank inside the fuel system.

The pipes used inside the low-pressure region are generally pipes formed in advance from plastic, which because of the installation conditions often have a shape that is other than rectilinear and are curved in arclike form. Molded plastic pipes can have a shape other than rectilinear for their internal contour and can have an external contour with a geometrically different course that is independent of the internal contour. Molded plastic pipes that carry fuel must meet stringent demands for strength and furthermore must have a high degree of security against bursting in the event of an accident. The molded plastic pipes used in the fuel system in the return region on the low-pressure region can be manufactured with and without throttle restrictions, which depends on the pressure to be preserved in the low-pressure region. In terms of their internal contour, molded plastic pipes that have a curve or an offset-bent portion or the like either cannot be shaped, or can be shaped only with relatively great effort. It is true that an arclike curved internal contour can be shaped, but no corner radius can be attained; moreover, freedom from burrs is not assured. In fuel-carrying molded plastic pipes that are in the crash zone and as a rule are made from high-strength plastic, there is a risk of fracture that increases with decreasing temperatures, so that in the low outdoor temperature range, there is the danger that this kind of molded plastic pipe will burst in the event of an accident and fuel will escape into the environment.

For this reason, in return pipes used in mass production in fuel injection systems, a special steel pipe extrusion-coated with a plastic jacket has been used. It is made by very complex shaping methods. Very high tolerance requirements must be met in order to attain the connection geometries with regard to the injection molding tool, the at least one fuel injector to be connected, and the connection layout specified by the automobile manufacturer. In a variant of the plastic pipe in the low-pressure region of the fuel injection system, inside which a remaining residual pressure level must be maintained, a bush throttle restriction must be fixed inside the inserted special steel pipe; in general, this is attained by roll-indenting the special steel and fixing the throttle restriction, which is preferably embodied as a bush throttle restriction, in the pipe by means of the two axially spaced-apart recesses created by the roll-indenting process.

The embodiment of the molded plastic pipe with an integrated special steel pipe, known from the prior art and used in large-scale mass production, has a number of disadvantages for the above-mentioned reasons, such as high weight, complicated shaping processes, special work steps for fixing possible throttle restrictions, and the like, so that a remedy must be created here.

SUMMARY AND ADVANTAGES OF THE INVENTION

According to the invention, in the context of a molded plastic pipe, it is proposed that an inner pipe, injection-molded from a plastic with low-temperature flexibility, be used which can be shaped largely arbitrarily and which in particular can be made from a plastic different from the plastic from which the extrusion coating of the molded plastic pipe is made. Precisely when the molded plastic pipes proposed according to the invention are employed, it is thus possible, despite stringent requirements for strength and dimensional stability, to use them in the low-pressure region as fuel-carrying line portions in fuel systems.

The plastic pipe can be cut into lengths from an extruded pipe and bent using a thermoplastic shaping process. Plastic pipes can be produced in endless form in an extrusion/injection molding process. The plastic pipes are wound onto a roll and can be cut to an arbitrary length. This production process is especially economical and its equality remains constantly high. The inside diameter has particular significance, since this diameter is sealed off by the injection tool core from the injection pressure. In contrast, when special steel pipes are used, not only the connection geometry but the sealing geometry relative to the tool must be embodied with high precision. The resultant tolerances in terms of the bending radius may be markedly broader, since only the inside diameter is a connection dimension that relates to the injection tool.

If the plastic pipe, for example cut to length from an extruded pipe, is provided with a throttle restriction, then the throttle restriction, embodied for instance as a bush throttle restriction, can already be embedded in the material of the plastic pipe thermoplastically during the bending process. Alternatively, it is entirely possible for the bush throttle restriction to be provided in addition with a groove extending in the circumferential direction, so that this bush throttle restriction can withstand higher forces without moving axially relative to the jacket of the inner pipe.

In a further conceivable embodiment of the molded plastic pipe proposed according to the invention, with less-stringent demands in terms of tolerances being made of the throttle restriction, the throttle restriction can also be embodied directly in the material comprising the inner pipe, making a further cost reduction possible, since a separate bushlike throttle restriction component can then be omitted. In terms of its external geometry, the molded plastic pipe proposed according to the invention has the same geometry used in mass production, so that no modifications for the sake of installation are necessary. The contour of the inner pipe of the molded plastic pipe is selected such that it is inside the requisite extruded outer coating. Preferably, the length of the inner pipe, made from plastic, is selected such that a sufficient wall thickness of the material comprising the extruded coating that sheathes the inner pipe can be assured. The material from which the sheathing extruded coating is made is not necessarily the same as that from which the inner pipe is injection-molded or extruded. The sealing geometries on the special steel pipe in the prior art are consequently, given the solution proposed by the invention to this problem, are now embodied in the plastic extruded coating of the inner pipe. The inner plastic pipe, preferably embodied with a smooth surface, is preferably bent thermoplastically, so that the contour is dimensionally stable for placement in the injection molding tool, i.e., the mold cavity, for producing the sheathing plastic extrusion coating. To assure crash safety, the inner plastic pipe is preferably made from plastic with low-temperature flexibility, and as a result, if the extrusion coating that sheathes the inner plastic pipe breaks, the inner pipe prevents fuel from escaping. For supporting the inner pipe inside the injection molding tool during the extrusion coating and the attendant production of the extrusion coating that sheathes the inner pipe, support cores are preferably inserted into the plastic tool, and in the course of the injection molding process the support cores are pulled all the way or part of the way out, so that it is possible to make a closed plastic layer at the support points. It is thus attained that if the inner pipe separates from the extruded coating that sheathes it, no leaks will occur. The internal contour of the inner plastic pipe and the contour of the extruded coating that sheathes the inner plastic pipe are adapted to one another in such a way that one continuous core both forms the inner geometry and can take on the task of supporting the inner plastic pipe against the injection pressure occurring in the injection molding process.

If an inner plastic pipe with which a throttle restriction is to be integrated is required, the throttle restriction can be fixed as a separate component, preferably in the curve of the inner plastic pipe. Advantageously, the mounting of the throttle restriction takes place before the bending of the inner plastic pipe, so that the throttle restriction can already be embedded in the plastic pipe thermoplastically in the form of an annular caulked feature. The throttle restriction can also be preshaped thermoplastically in the inner plastic pipe and in the injection molding process can be fixed during the injection process by means of an offset of a support mandrel that dips into the throttle restriction with only slight play, in order to assure the dimensional stability.

A further advantage of the molded plastic pipe proposed according to the invention is considered to be that when an endless pipe is used, a largely arbitrary course of the internal contour is possible, without having to use a worked inlay part.

BRIEF DESCRIPTION OF THE DRAWINGS

The invention is described in further detail below in conjunction with the drawings, in which.

DESCRIPTION OF THE PREFERRED EMBODIMENTS

Figure 1:
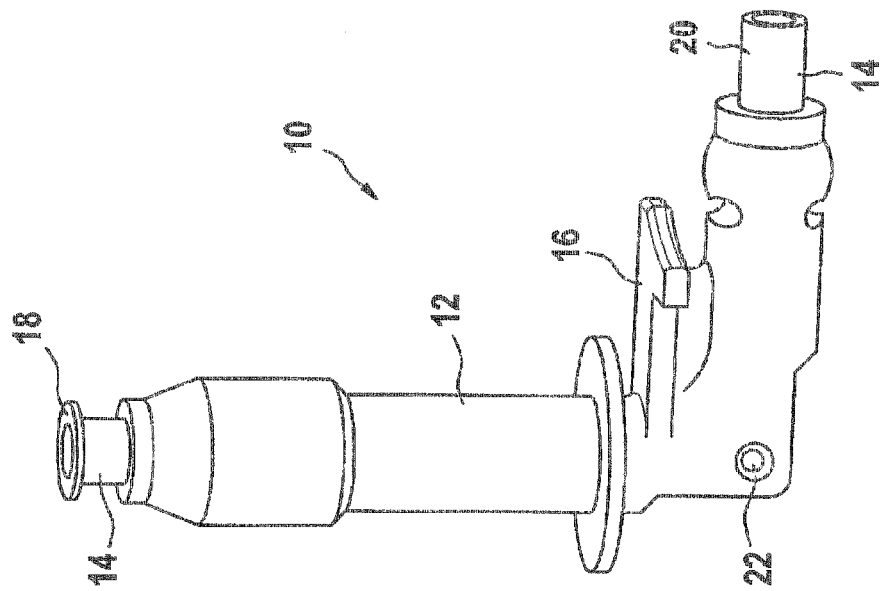
FIG. 1 shows the embodiment, used so far in mass production, of the return pipe with a special steel pipe surrounded by a plastic jacket and with connection geometries embodied on it.

From FIG. 1, a view can be seen of a molded pipe known from the prior art.

It can be seen from FIG. 1 that the molded pipe 10 shown there includes an extruded coating 12 of a plastic material, which in turn surrounds a special steel pipe 14. A plateau indicated by reference numeral 16 is injection-molded integrally onto the extruded coating 12 of the molded pipe 10. The special steel pipe 14, on one end, has a connection flange 18 embodied on the material of the special steel pipe 14, and on its other end, the special steel pipe has a projecting connection piece 20. Below the connection flange 18 of the special steel pipe 14 and on the special steel pipe is a sealing ring receptacle, on which an elastically deformable O-ring, for instance, can be received.

The extruded coating 12 of the molded pipe 10 in the view in FIG. 1 furthermore includes a bore 22, with which the molded pipe 10, a composite part including the special steel pipe 14 and the extruded coating 12, is secured in the engine compartment of a motor vehicle.

Figure 2:
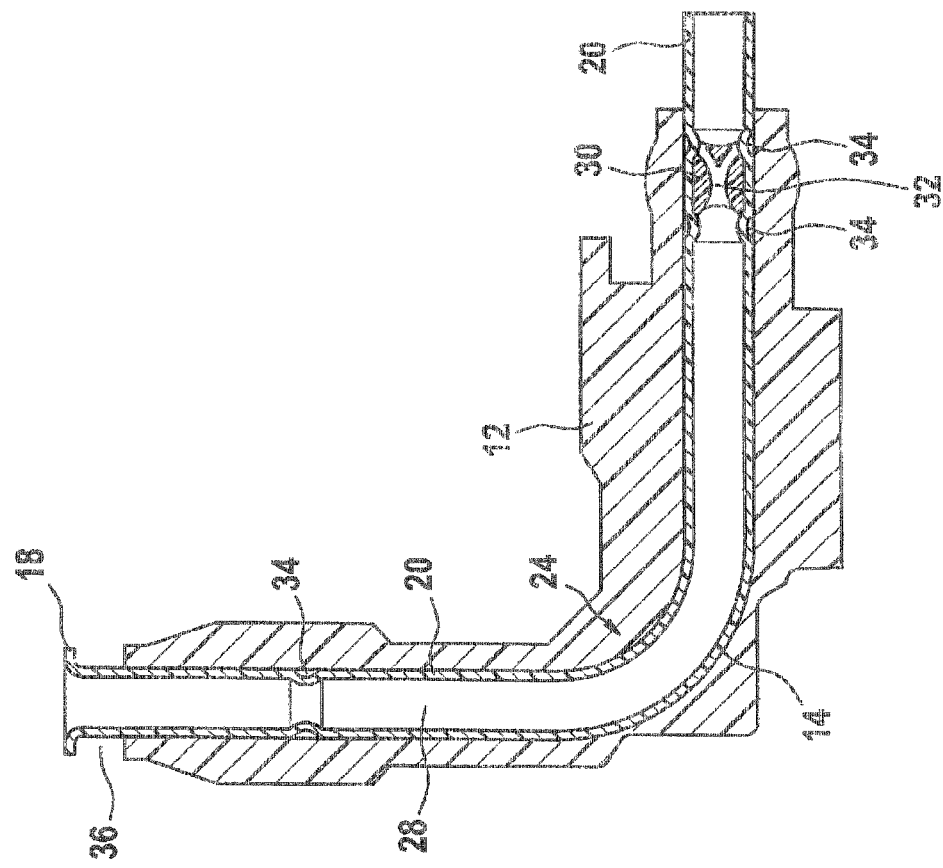
FIG. 2 is a section through the return pipe with the special steel pipe, used in mass production, shown in FIG. 1.

FIG. 2 shows a section through the molded pipe shown in FIG. 1 and known from the prior art.

From FIG. 2 it can be seen that, as indicated in FIG. 1, there is an O-ring receptacle 36 below the connection flange 18 on the upper end of the special steel pipe 14. FIG. 2 shows that the special steel pipe 14 describes a 90° curve 24 and has two rectilinear portions of different lengths. Reference numeral 26 identifies the wall of the special steel pipe 14, whose wall thickness is essentially constant along the entire course of the pipe. The special steel pipe 14 is embodied symmetrically to its pipe axis 28. It can also be seen from the sectional view in FIG. 2 that there is a bush throttle restriction 30 in the pipe cross section. The bush throttle restriction 30 is shown as a separate fixture in the view in FIG. 2 and includes a throttle restriction cross section 32. The axial fixation of the bush throttle restriction 30 is accomplished by means of two rolled indentations 34, which are embodied in the pipe wall 26 of the special steel pipe 14, in order to fix the bush throttle restriction 30 axially in the flow cross section of the special steel pipe 14. A further rolled indentation 34 is located below the connection flange 18 embodied in the special steel pipe 14. It serves the purpose of mechanically clamping the special steel pipe 14 and the plastic extruded coating 12.

From the views in FIGS. 1 and 2, it can be seen that the molded pipe 10 shown there is a composite component comprising a metal special steel pipe 14 and a plastic material from which the extruded coating 12 is made. For connection of the special steel pipe 14, which on the one hand has a certain intrinsic weight, not only the connection flange 18, connection piece 20, and 90° curve 24, but the various rolled indentations 34 as well, are all required in preparatory processes for fixation of the bush throttle restriction 30, before the plastic extruded coating can be applied. The molded pipe 10 known from the prior art and shown in FIGS. 1 and 2 has relatively high intrinsic weight and overall is relatively expensive to produce.

Figure 3:
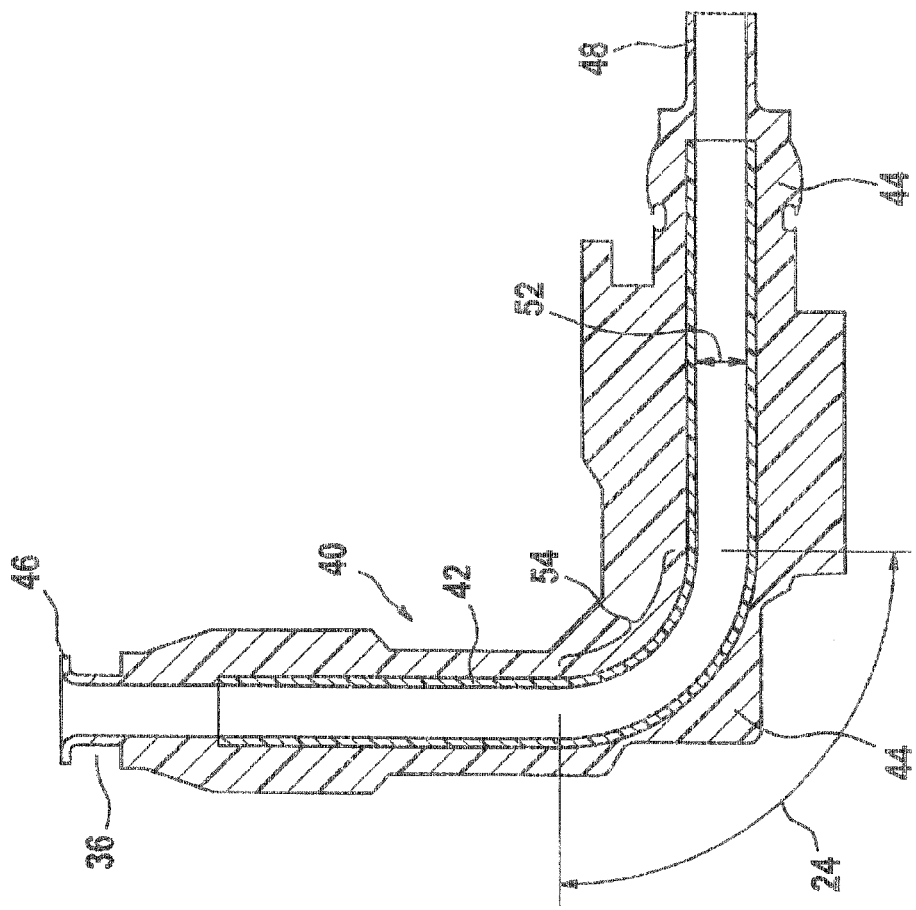
FIG. 3 shows the molded plastic pipe proposed according to the invention, with an inner plastic pipe and an extruded coating that sheathes it.

FIG. 3 shows a perspective view of one embodiment of the molded plastic pipe proposed according to the invention.

From the view in FIG. 3, it can be seen that the molded plastic pipe 40 proposed according to the invention includes an inner plastic pipe 42, which has a 90° curve 24 and in turn is entirely surrounded by an extruded outer coating 44 that is likewise made from plastic. A connection flange 46 is integrally injection-molded on one end of the extruded outer coating 44, and a connection piece in tubular form—see reference numeral 48—is embodied on the other end. These components, that is, the connection points 46, 48, must be embodied separately in separate work steps on the special steel pipe 14 in the embodiment shown in FIGS. 1 and 2 of a molded pipe 10 with a special steel pipe 14. While the extruded outer coating 44 of the molded plastic pipe 40 proposed according to the invention is being produced inside a plastic injection-molding robot or plastic injection-molding tool, the connection flange 46 and the tubular connection piece 48 can be produced directly on the extruded outer coating 44 during the production of the extruded outer coating 44. This can be seen from the view in FIG. 3. The O-ring receptacle 36 can furthermore also be produced during the production of the integrally injection-molded flange 46 on the extruded outer coating 44 in the course of the plastic injection molding, without requiring separate work steps. The jacket face of the inner plastic pipe 42, surrounded by the extruded outer coating 44, is identified by reference numeral 50. Preferably, the inner plastic pipe 42 is constructed as a pre-shaped pipe, cut apart from an extruded pipe, and in the originally rectilinear inner plastic pipe 42, after it has been cut to length, the 90° curve 24, to name one example, is made in the course of a thermoplastic process. Instead of the 90° curve 24 shown in FIG. 3 on the inner plastic pipe 42, still other degrees of curvature, differing from 90°, can also be made. The same is analogously true for a pre-bent portion 54 that is not located in the plane of the drawing in FIG. 3, that is, the X-Y plane, but instead for example in the X-Z plane or some other plane not shown in the drawing in FIG. 3. For the sake of completeness, it should be noted that the inner plastic pipe 42 extrusion-coated with the extruded outer coating 44 has a cross section 52 which may, if it is necessary to maintain a certain return residual pressure level in the low-pressure region, contain a throttle restriction, not shown in FIG. 3.

Figure 4:
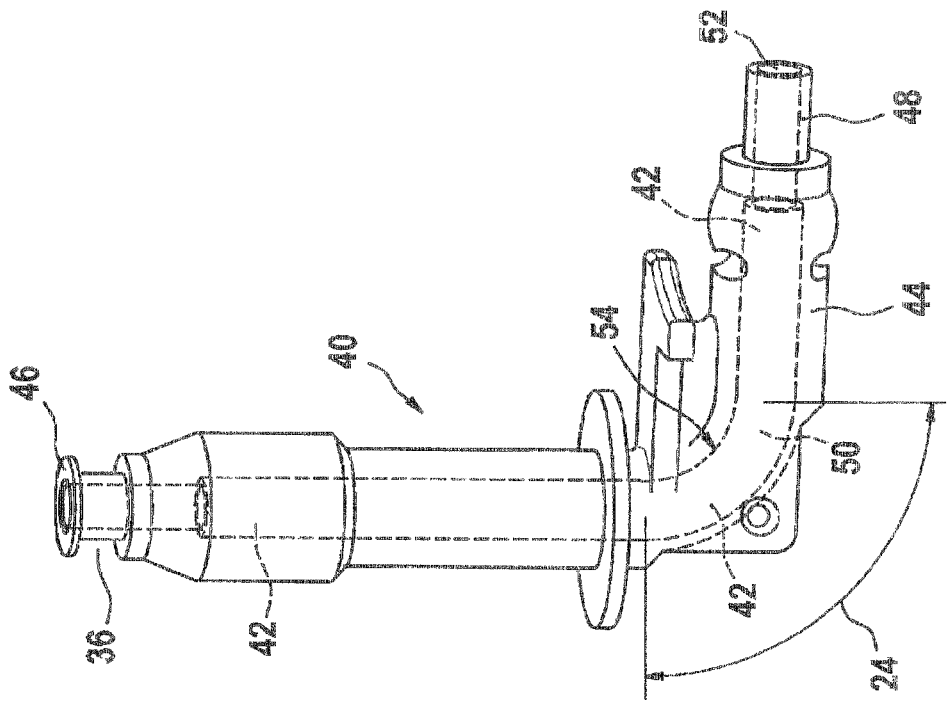
FIG. 4 is a section through the embodiment shown in FIG. 3 of the molded plastic pipe proposed according to the invention.

In FIG. 4, a section is seen through the molded plastic pipe 40 proposed according to the invention and shown in perspective in FIG. 3, the molded plastic pipe being made entirely of plastic material.

FIG. 4 also shows the O-ring receptacle below the integrally injection-molded flange 46. FIG. 4 shows that the extruded outer coating 44 of plastic material contacts the jacket face 50 of the inner plastic pipe 42 and entirely surrounds it, so that the inner plastic pipe 42, in terms of its contour, is completely surrounded by the extruded outer coating 44. The geometry of the extruded outer coating 44 thus depends on the prefabricated blank for the inner plastic pipe 42, which is preferably placed as an extruded pipe portion, cut to length, in the plastic injection molding tool and can be fixed in it via support cores, for example, before the extruded outer coating 44 of plastic material is made. Preferably, the extruded pipe from which individual inner plastic pipes 42 are cut to length is an extruded pipe of the kind made from a plastic material with low-temperature flexibility. The production of the inner plastic pipe 42 from a plastic with low-temperature flexibility starting material offers the advantage that in the event of an accident, the inner plastic pipe 42, even if the extruded outer coating 44 is damaged, will not burst but will remain intact, so that from this fuel-carrying component of a fuel injection system for internal combustion engines, no fuel will escape into the environment in the event of an accident.

From FIG. 4, it can be seen that the 90° curve 24 represents the pre-bent portion 54. Preferably, this pre-bent portion 54, which in this exemplary embodiment is embodied as a 90° curve 24, is produced in the course of a thermoplastic process after the inner plastic pipe 42 has been cut to length from the extruded pipe. During the thermoplastic process for creating the pre-bent portion 54 of the inner plastic pipe 42, a throttle restriction can optionally be produced in the flow cross section 52 of the inner plastic pipe 42. In the event that only slight demands for tolerances have to be met, the throttle restriction can be attained for instance by means of a deformation in the pipe wall of the inner plastic pipe 42, or in other words by a deformation of the extruded pipe made from material with low-temperature flexibility, so that a throttle restriction cross section is formed by the opposed walls, spaced closely apart from one another, of the inner plastic pipe 42.

On the other hand, a separate component embodied for instance as a bush throttle restriction can also be inserted into the flow cross section 52 of the inner plastic pipe 42 of plastic with low-temperature flexibility in the course of the thermoplastic process, before the at least one pre-bent portion 54 is created, and by the creation for instance of a 90° curve 24 can be embedded during the thermoplastic process in the inner plastic pipe 42 inside the 90° curve 24.

Figure 5:
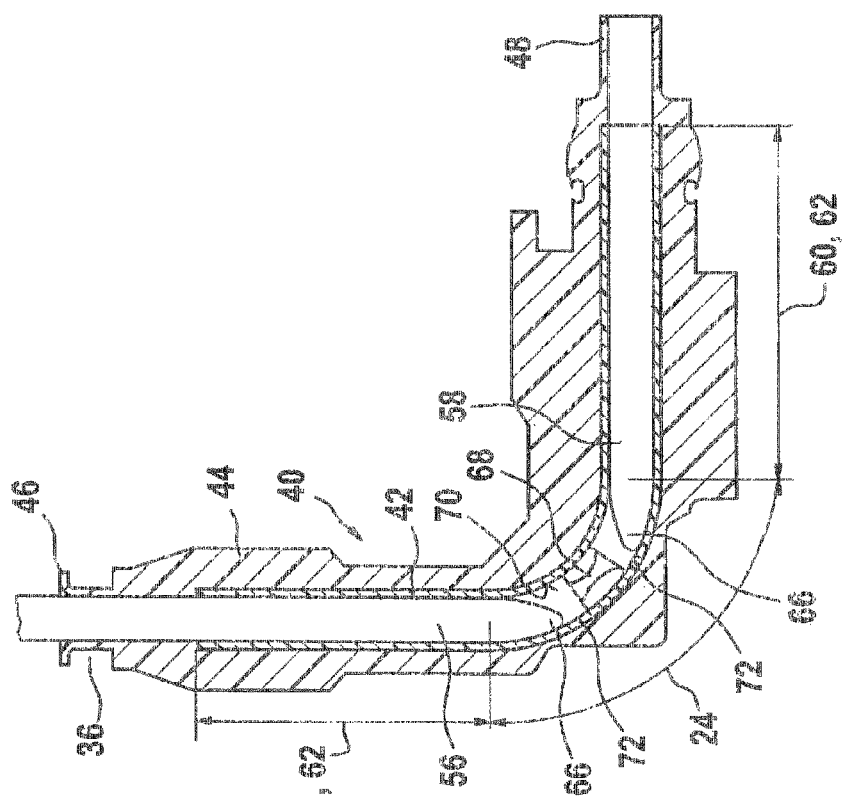
FIG. 5 shows support cores, driven into the inner plastic pipe of the molded plastic pipe proposed according to the invention, for the sake of fixation in the plastic injection molding tool.

From FIG. 5, an inner plastic pipe of the molded pipe proposed according to the invention can be seen that is fixed by means of support cores of the injection-molding tool.

As can be seen from FIG. 5, along with the prefabricated inner plastic pipe 42 preferably embodied as an extruded pipe cut to length with at least one previously produced pre-bent portion 54, the molded pipe 40 as proposed according to the invention includes the extruded outer coating 44. This coating has a connection flange 46, integrally formed on in the plastic injection-molding process, as well as a tubularly embodied connection piece 48. Below the formed-on connection flange 46 is the aforementioned O-ring receptacle 36. As seen from FIG. 5, the inner plastic pipe 42, in addition to the at least one pre-bent portion 54, here embodied as a 90° curve 24, also includes a first rectilinear portion having a length 62 as well as a second rectilinear portion having a further length 64. FIG. 5 shows that a first support core 56 and a second support core 58 are inserted into the cross section 52 of the inner plastic pipe 42 to an insertion depth 60 predetermined by the lengths 62, 64. To avoid damage to the inner wall of the cross section 52 of the inner plastic pipe 42, the first and second support core 56, 58 each have rounded support core ends 66. These permit insertion of the support cores 56, 58 into the cross section 52 of the inner plastic pipe 42 without damage and with little friction.

The inner plastic pipe 42, made from the plastic material with low-temperature flexibility and provided with at least one pre-bent portion 54 in the course of the thermoplastic process, is fixed and held in the plastic injection-molding tool by the first support core 56 and the second support core 58 during the embodiment of the extruded outer coating 44. The jacket face 50 of the inner plastic pipe 42 is preferably embodied as smooth and may optionally be pretreated with an adhesion primer. For supporting the inner plastic pipe 42 that is introduced as a preshaped blank into the injection-molded tool, the two support cores 56, 58 support the inner plastic pipe during the extrusion coating with the material from which the extruded outer coating 44 is made, and they are pulled all or part of the way out of the cross section 52 over the course of the injection-molding process, so as to achieve a closed plastic layer at the support points. It is thus assured that if the inner plastic pipe 42 separates from the extruded outer coating 44, no leak will occur. In addition to the two support cores 56, 58, which support the inner plastic pipe 42 against the injection pressure and at the same time seal it off during the entire injection-molding process, a plurality of fixation dies are provided radially in the injection tool toward the jacket face of the inner plastic pipe 42; they fix the inner plastic pipe 42 until the injection-molding tool is closed and the support cores 56, 58 have been driven into the inner plastic pipe 42. The fixation dies should preferably be withdrawn partially or completely before the injection-molding repressurization begins, so that a closed plastic face forms around the inner plastic pipe 42.

The internal contour of the inner plastic pipe 42 and of the extruded outer coating 44 are adapted to one another such that a continuous core not only embodies the inner geometry but also optionally takes on the task of supporting the inner plastic pipe 42 against the injection pressure prevailing in the plastic injection-molding tool.

It can furthermore be seen from FIG. 5 that the support core ends 66 of the first support core 56 and the second support core 58 of the plastic injection-molding tool are inserted so far into the 90° curve 24, as which the pre-bent portion 54 is embodied in this variant embodiment, that the curvatures of the support core ends 66 rest on the inner wall of the inner plastic pipe 42.

The extruded outer coating 44 is made from a material which has good dimensional and strength properties even at high engine compartment temperatures. The plastic material for the inner plastic pipe 42, by comparison, must have an especially good notch impact toughness at relatively low temperatures.

Figure 6:
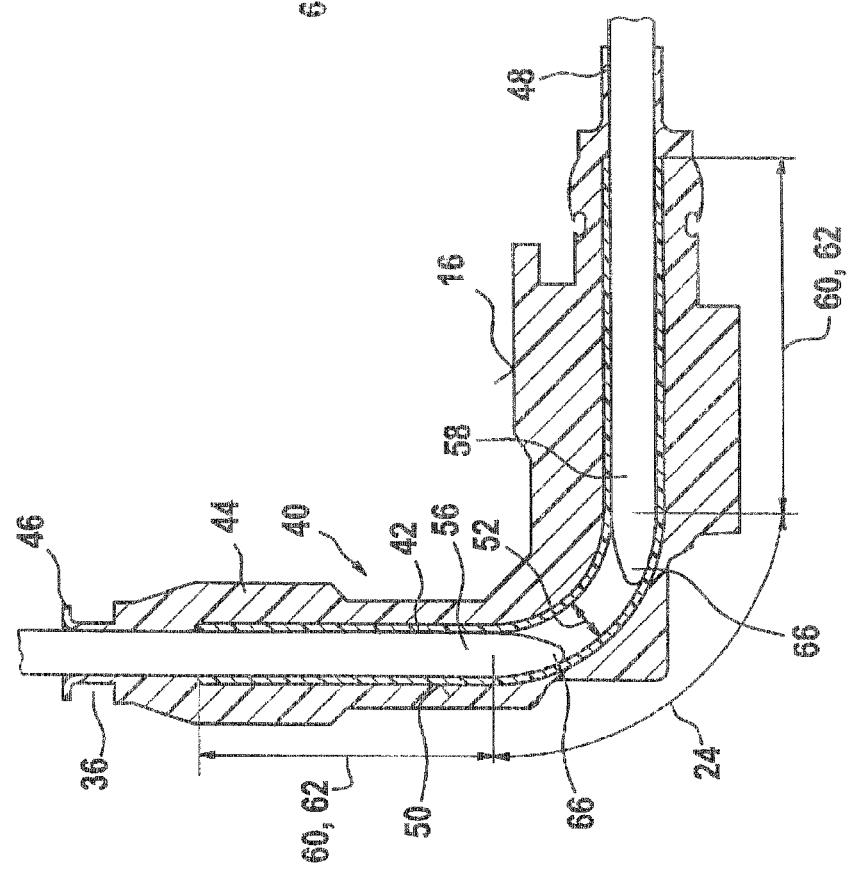
FIG. 6 shows a throttle element in the form of a bush throttle restriction that is inserted into the inner plastic pipe.

In FIG. 6, an embodiment is shown of the molded plastic pipe proposed according to the invention with a throttle restriction.

From FIG. 6, it can be seen that in this embodiment of the molded plastic pipe 40 proposed according to the invention, the molded plastic pipe 40 includes a throttle restriction, embodied as a bush throttle restriction, at a position 68. Before being placed in the injection-molding tool, the inner plastic pipe 42 is cut to length from an extruded pipe of plastic material with low-temperature flexibility, and in the course of a thermoplastic process, it is provided with at least one pre-bent portion 54 (FIG. 3). Before the performance of the thermoplastic process for creating the at least one pre-bent portion 54 in the inner plastic pipe 42, the bush throttle restriction 30, for example, can be inserted into the inner plastic pipe until it is located at the installation position 68. After that, the creation of the at least one pre-bent portion 54 in the X-Y plane or in a plane perpendicular to that is done, for example for creating the 90° curve that is represented by reference numeral 24, Instead of the 90° curve 24 shown in FIGS. 3 through 6, this curve may be embodied with any arbitrary number of degrees to suit installation conditions or may be embodied in other orientations relative to the plane of the drawing shown.

Once the throttle element, embodied for instance as a bush throttle restriction 30, has been inserted into the portion, still with a rectilinear course, of the inner plastic pipe 42, the embedding of the bush throttle restriction 30 in the soft plastic material of the inner plastic pipe 42 and its digging into the inner wall are effected upon the thermoplastic deformation of the inner plastic pipe 42. To make it possible to withstand relatively high axial forces, the bush throttle restriction 30 may also have fluting or raised portions or indentations in the form of grooves, which enable an undercut with the soft plastic material during the embodiment of the at least one pre-bent portion 54. In this case, for instance by means of the inserted depth 60 and length 62 of the two support mandrels, the installation position 68 of the bush throttle restriction 30 can be determined and maintained while the extruded outer coating 44 is being made.

In a further possible embodiment of the molded plastic pipe 40 proposed according to the invention, the throttle restriction cross section 32 may optionally also be created by deforming the pipe wall 26 of the inner plastic pipe 42 such that the opposed wall portions form a throttle restriction cross section 32. This is possible for example whenever it is possible for relatively slight demands for tolerance to be made of the molded plastic pipe 40—depending on the intended use. This is possible for instance whenever slight demands for tolerances are made of the throttle restriction cross section, since the production precision with plastic is fundamentally less than with metal materials, which because of the high coefficients of temperature expansion and lower moduli of elasticity are more sensitive to changes in temperature and pressure.

FIG. 6 furthermore shows that in this embodiment as well, both the first support core 56 and the second support core 58, each with rounded support core ends 66, protrude into the 90° curve 24. The insertion depths 60 of the first support core 56 and the second support core 58 depend on the length 62 of the first rectilinear portion and on the length 62 of the second rectilinear portion, respectively, of the preshaped inner plastic pipe 42. In this embodiment as well, the rounded support core ends 66 preferably rest on the inner wall of the flow cross section 52 of the fuel-carrying inner plastic pipe 42. As already noted, the at least one pre-bent portion 54 in the inner plastic pipe 42 may also have curvatures other than 90° and may be embodied in a plane of the drawing that is not shown in FIGS. 3 through 6 and extends perpendicular to the plane of the drawing shown.

The foregoing relates to the preferred exemplary embodiments of the invention, it being understood that other variants and embodiments thereof are possible within the spirit and scope of the invention, the latter being defined by the appended claims.

The invention claimed is:

1. A molded plastic pipe for fuel-carrying return lines in injection systems for internal combustion engines, comprising:
   an inner pipe;
   an outer coating disposed on the inner pipe, the outer coating made of plastic material; and
   connections on the outer coating for further components of a fuel injection system,
   wherein the inner pipe is embodied as an inner plastic pipe with at least one pre-bent portion,
   wherein said inner plastic pipe is made from a plastic having low-temperature flexibility and said outer coating is made from a different plastic which, even at high engine compartment temperatures, has good dimensional stability and strength properties,
   wherein the outer coating has an integrally formed-on flange, a freely accessible tubular connection piece that is integrally injected, and at least one recess immediately adjacent the flange for receiving a sealing element, and
   wherein the inner plastic pipe, including an end edge thereof, is entirely surrounded by the plastic material of the outer coating.

2. The molded plastic pipe as defined by claim 1, wherein the inner plastic pipe is an extruded pipe cut into lengths, and the at least one pre-bent portion is created by a thermoplastic process.

3. The molded plastic pipe as defined by claim 1, wherein a throttle restriction is embodied in the at least one pre-bent portion, the pre-bent portion being embodied as a 90° curve.

4. The molded plastic pipe as defined by claim 2, wherein a throttle restriction is embodied in the at least one pre-bent portion, the pre-bent portion being embodied as a 90° curve.

5. The molded plastic pipe as defined by claim 4, wherein the throttle restriction is embodied as a bush throttle restriction, which during the thermoplastic process is embedded in a cross section of the inner plastic pipe.

6. The molded plastic pipe as defined by claim 3, wherein the throttle restriction is embodied as a bush throttle restriction, which during a thermoplastic process is embedded in a cross section of the inner plastic pipe.

7. The molded plastic pipe as defined by claim 1, wherein a throttle restriction cross section is formed in the inner plastic pipe by a deformation of a wall of the pipe.

8. The molded plastic pipe as defined by claim 2, wherein a throttle restriction cross section is formed in the inner plastic pipe by a deformation of a wall of the pipe.

* * * * *